United States Patent [19]
Hazama

[11] Patent Number: 5,796,087
[45] Date of Patent: Aug. 18, 1998

[54] NONCOAXIAL BAR CODE READER OPERABLE WITHOUT CONDENSER LENS

[75] Inventor: Akihito Hazama, Osaka, Japan

[73] Assignee: Keyence Corporation, Osaka, Japan

[21] Appl. No.: 678,058

[22] Filed: Jul. 9, 1996

[30] Foreign Application Priority Data

Jul. 18, 1995 [JP] Japan ................................. 7-205301

[51] Int. Cl.$^6$ ................................................... G06K 7/10
[52] U.S. Cl. ......................... 235/462; 235/454; 235/467; 235/470; 250/566
[58] Field of Search ........................... 235/462, 454, 235/467, 470, 472; 250/566, 568

[56] References Cited

U.S. PATENT DOCUMENTS

| 4,402,088 | 8/1983 | McWaters et al. | 235/454 X |
|---|---|---|---|
| 4,673,805 | 6/1987 | Shepard et al. | 235/472 |
| 5,080,456 | 1/1992 | Katz et al. | 235/472 |
| 5,206,492 | 4/1993 | Shepard et al. | 235/470 X |
| 5,350,909 | 9/1994 | Powell et al. | 235/472 |
| 5,408,084 | 4/1995 | Brandorff et al. | 235/472 X |
| 5,410,140 | 4/1995 | Bard et al. | 235/462 |
| 5,477,044 | 12/1995 | Aragon | 235/470 X |
| 5,532,469 | 7/1996 | Shepard et al. | 235/472 |
| 5,543,610 | 8/1996 | Bard et al. | 235/462 |
| 5,552,592 | 9/1996 | Dvorkis et al. | 235/467 X |
| 5,559,320 | 9/1996 | Loya | 235/467 |
| 5,581,068 | 12/1996 | Shepard et al. | 235/462 |

FOREIGN PATENT DOCUMENTS 0584830  3/1994  European Pat. Off. .

Primary Examiner—Donald T. Hajec
Assistant Examiner—Michael G. Lee
Attorney, Agent, or Firm—Sughrue, Mion, Zinn, Macpeak & Seas, PLLC

[57] ABSTRACT

A bar code reader comprises: a laser for projecting light; a polygon mirror for scanning a bar code with light from the laser; a way-in window allowing the reflecting light from the bar code to pass therethrough; and a light receiving surface including a photo diode, for receiving the reflecting light through the way-in window and transforming the reflecting light into an electrical signal, wherein the light receiving surface is formed to take a rectangle corresponding to a shape and a size of the way-in window, the light receiving surface is placed apart from the way-in window, while facing the way-in window, and no condenser lens is provided between the light receiving surface and the way-in window.

15 Claims, 4 Drawing Sheets

NONCOAXIAL BAR CODE READER OPERABLE WITHOUT CONDENSER LENS

BACKGROUND OF THE INVENTION

The present invention relates to a bar code reader and a casing for the bar code reader.

In the field of the bar code reader, designers are under an intensive pressure of size reduction of the bar code reader. The bar code reader comes in two categories, a coaxial bar code reader and a noncoaxial bar coder reader. In the coaxial bar code reader, a projecting light path is coincident in part with a receiving light path. In the noncoaxial bar coder reader, the former is not coincident with the latter. An example of the noncoaxial bar coder reader is shown in FIG. 6.

In FIG. 6, laser light L is emitted from a laser (light projecting means) 100 to a polygon mirror (scanning means) 101. The polygon mirror 101 reflects the laser light L to a bar code B and scans the bar code with the laser light. Light L1 is reflected by the bar code B, gathered by a condenser lens 102, and incident on a light receiving means 103, for example, a photo diode (PD). Thus, in the noncoaxial bar coder reader, a light path of the laser light L, which is emitted from the laser 100 and directed to the bar code B, is different from a light path of the reflecting light L1, which is reflected by the bar code B and directed to the light receiving means 103. In the noncoaxial bar coder reader, the dead zone caused by the light paths is smaller than that in the coaxial bar code reader. Accordingly, the former is superior to the latter in the size reduction of the bar code reader.

In the conventional art, the reflecting light L1 is gathered by the condenser lens 102 as referred to above. Because of this, the light receiving means 103 must be placed at a location 20 to 30 mm apart from the rear side of the condenser lens 102, as shown in FIG. 7. This fact hinders a satisfactory size reduction of the bar code reader.

SUMMARY OF THE INVENTION

The present invention has been made in view of the above circumstances and has an object to further reduce the size of a bar code reader.

According to a first aspect of the invention, there is provided a bar code reader, wherein a light receiving surface of light receiving means is formed to take a rectangle corresponding to the shape and the size of a way-in window. The light receiving means is placed apart from the way-in window, while facing the way-in window. No condenser lens is provided between the light receiving surface and the way-in window.

Since no condenser lens is provided between the light receiving surface and the way-in window, the light receiving surface of the light receiving means may be located close to the way-in window. Accordingly, the size reduction of the bar code reader is realized.

According to a second aspect of the invention, there is provided the bar code reader described above, wherein the light receiving surface of the light receiving means is formed to take a rectangle similar to the way-in window in shape and size, and the light receiving means is placed apart from the way-in window, while facing the way-in window.

DETAILED DESCRIPTION OF THE PREFERRED EMBODIMENTS

The preferred embodiments of the present invention will be described with reference to the accompanying drawings.

Figure 1:
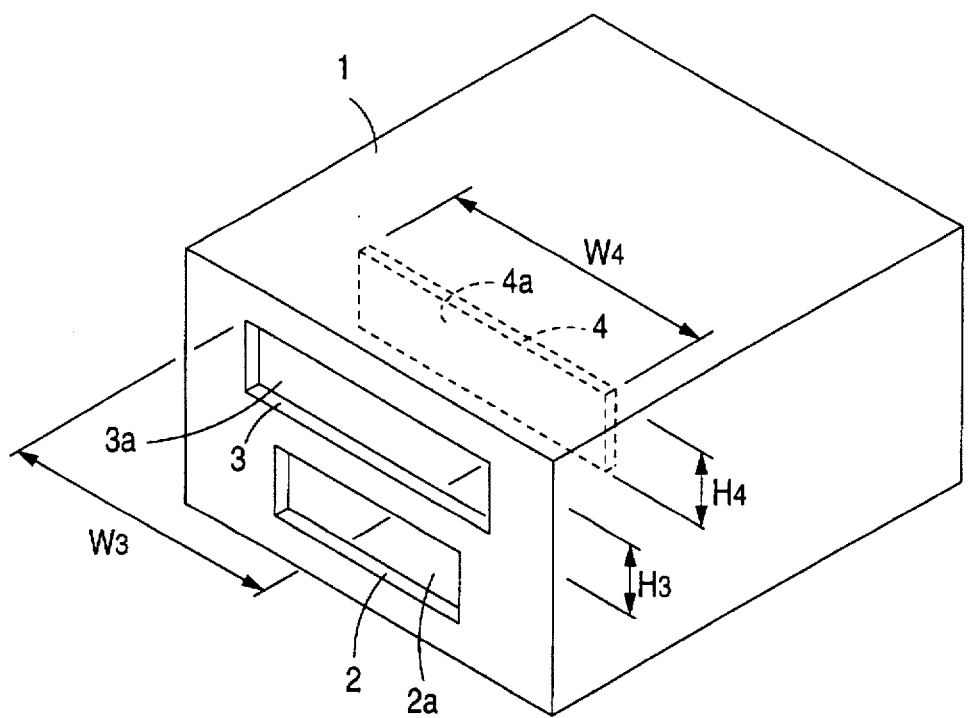
FIG. 1 is a perspective view showing a bar code reader according to a first embodiment of the present invention.
Figure 2:
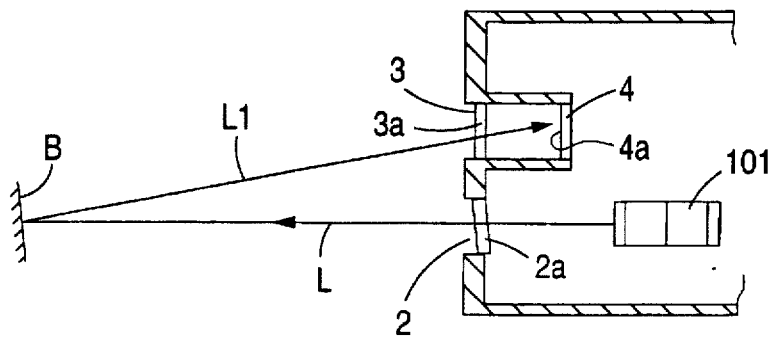
FIG. 2 is a cross sectional view showing a key portion of the bar code reader.
Figure 3:
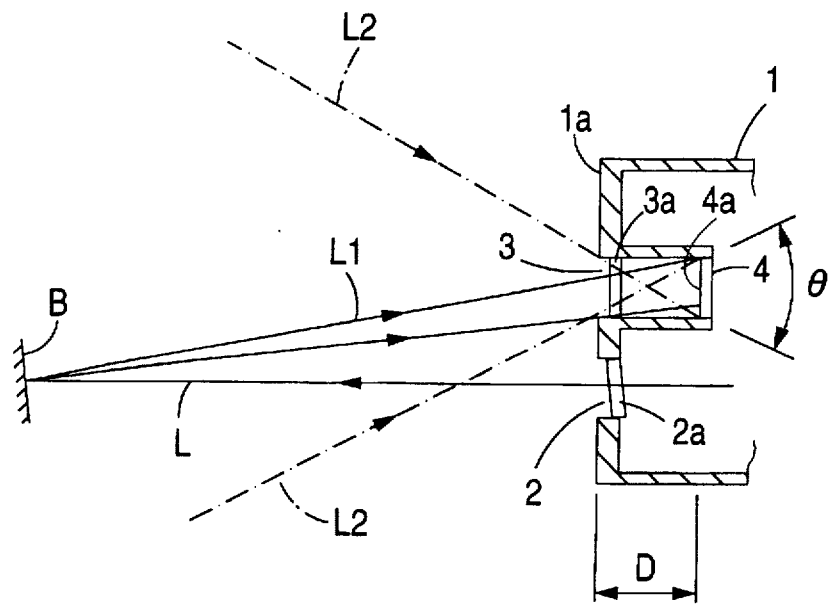
FIG. 3 is a cross sectional view showing the disturbance light reaching the light receiving surface.

FIGS. 1 to 3 show a first embodiment of the invention.

In FIG. 1, a way-out window 2 and a way-in window 3, which are formed in a case 1 of a noncoaxial bar coder reader, are arranged in a juxtaposition fashion. As shown in FIG. 2, the way-out widow 2, which is provided with a filter 2a, allows laser light L1 from the polygon mirror 101 to pass therethrough to the bar code. Incidently, the polygon mirror 101 receives laser light from a laser (projecting means), not shown, and reflects the light while the polygon mirror rotates for scan. The way-in window 3, which is provided with a band-pass filter 3a, allows the reflecting light L1 reflected by the bar code B to enter the inside of the case 1, through the way-in window 3.

Figure 6:
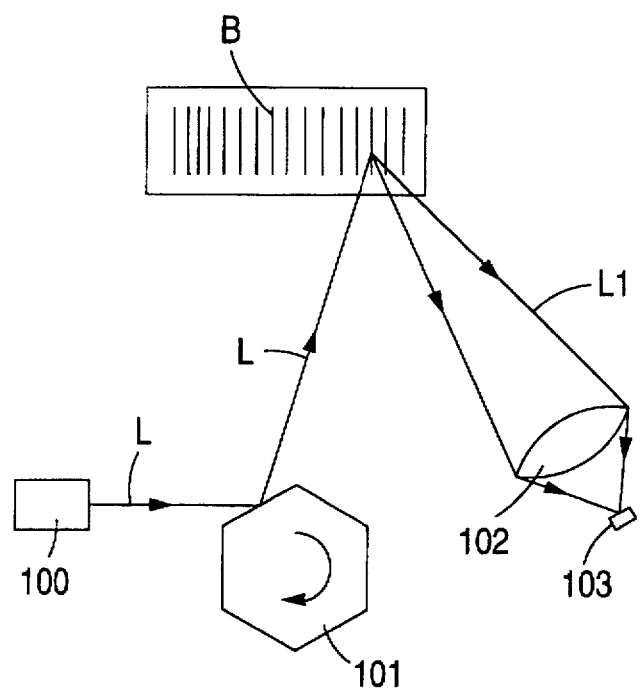
FIG. 6 is a view schematically showing a conventional bar code reader.
Figure 7:
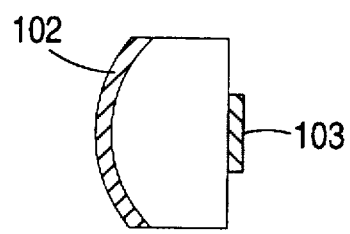
FIG. 7 is a cross sectional view including a condenser lens and a PD.

Within the case, a light receiving means 4 is placed at a location slightly apart from the band-pass filter 3a of the way-in window 3, while facing the band-pass filter 3a. The light receiving means 4 may be constructed with an array of a number of light sensing elements, e.g., PDs. As shown in FIG. 1, a light receiving surface 4a of the light receiving means 4 is formed to have substantially the same shape and size as those of the way-in window 3 that is rectangular in shape. It is noted that no condenser lens is provided between the way-in window 3 and the light receiving surface 4a. The size of the way-in window 3 is so selected as to minimize the adverse influence by disturbance light and guide the reflecting light L1 to the light receiving surface 4a of the light receiving means. The remaining construction of the bar code reader is similar to the conventional art of FIG. 6.

As stated above, in the bar code reader, no condenser lens is provided between the way-in window 3 and the light receiving surface 4a. Accordingly, there is no need of gathering reflecting light L1. This leads to size reduction of the bar code reader.

In the invention, no condenser lens is used, and the light receiving surface 4a has a large size. Accordingly, disturbance light L2 is incident on the light receiving surface 4a within a range defined by a large angle θ. It is likely to lead to reduction of an S/N (signal/noise) ratio. To avoid this, the light receiving surface 4a is put at a location apart from the way-in window 3. A distance D from the front side 1a of the case 1 to the light receiving surface 4a is approximately 10 mm in this embodiment. By so selecting the distance, the angle θ is small, so that the disturbance light L2 is hard to reach the light receiving surface 4a, and the S/N ratio is not reduced.

Figure 4:
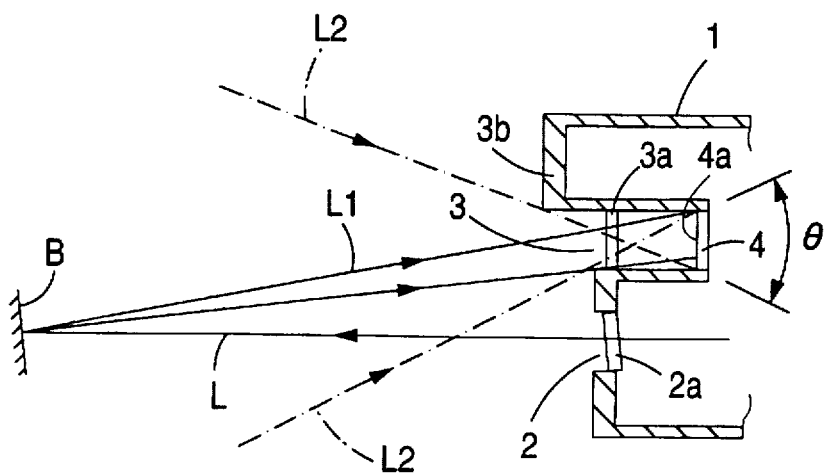
FIG. 4 is a cross sectional view showing a bar code reader according to a second embodiment of the present invention.

In this sense, it is preferable to provide a protruded portion 3b extending to the front from the upper side of the way-in window 3 that is opposite to the lower side thereof closer to the way-out window 2, as shown in FIG. 4. With provision of the protruded portion, the angle θ at which the disturbance light L2 may be incident on the light receiving surface is small, so that the disturbance light L2 is effectively blocked.

Figure 5:
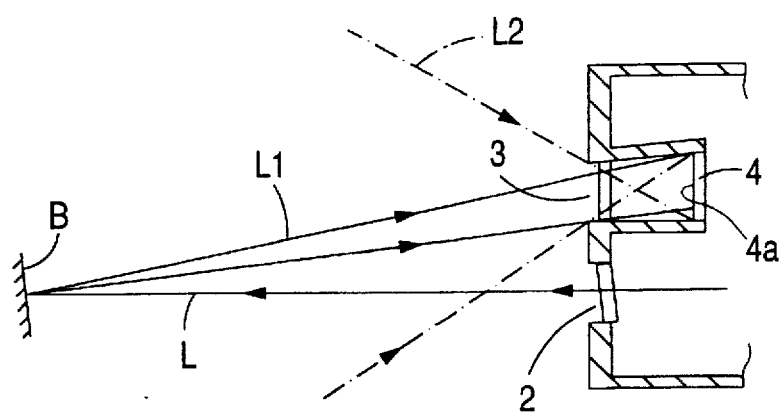
FIGS. 5(a) to 5(c) are cross sectional views showing bar code readers according to a third embodiment of the present invention.
Figure 5:
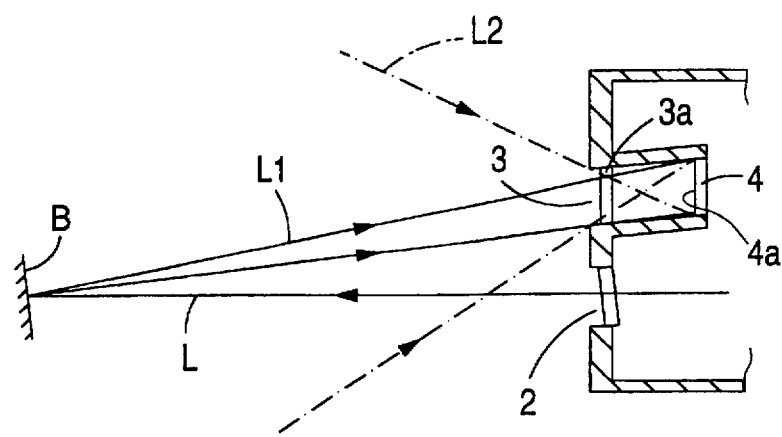
Figure 5:
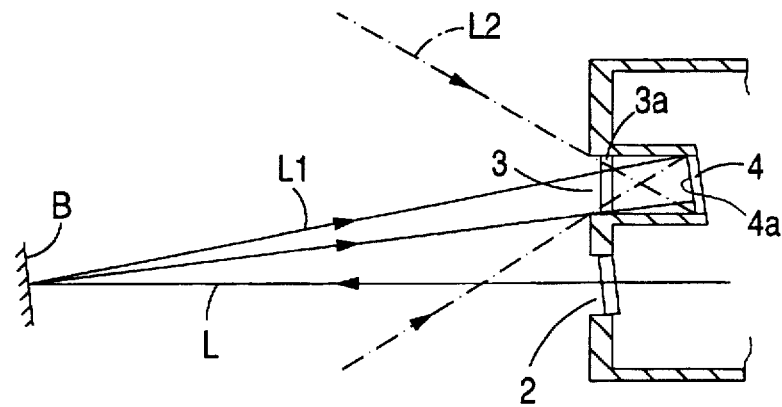

In the embodiment mentioned above, the light receiving surface 4a is formed to have substantially the same shape and size as those of the way-in window 3. However, the light receiving surface 4a may be formed to take a rectangle corresponding to the shape and the size of the way-in window 3. The light receiving surface 4a may be larger than the way-in window 3 as shown in FIG. 5(a). In this case, the shape of the light receiving surface 4a is somewhat different from the way-in window 3 (that is, those shapes are not similar).

In the invention, the wording "a rectangle corresponding to the shape and the size of the way-in window 3" involves the meaning of "a rectangle similar to the way-in window 3 in shape and size", and further such a bar code reader that the width W3 and the height H3 of the way-in window 3, and the width W4 and the height H4 of the light receiving surface 4a (FIG. 1) satisfy both the following inequalities (1) and (2), and no condenser lens is provided is within the first aspect of the present invention:

$$0.5W3 \leq W4 \leq 2.0W3 \quad (1)$$

$$0.5H3 \leq H4 \leq 2.0H3 \quad (2)$$

In the second aspect of the invention, the wording "a rectangle similar to the way-in window 3 in shape and size" involves at least a bar code reader which satisfies the following two inequalities (3) and (4):

$$0.8W3 \leq W4 \leq 1.2W3 \quad (3)$$

$$0.8H3 \leq H4 \leq 1.2H3 \quad (4)$$

Instead of the light receiving means 4 being located right behind the way-in window 3 in the FIG. 2, the light receiving means 4 may be located obliquely behind the way-in window 3 as shown in FIG. 5(b). The light receiving surface 4a may be slightly slanted to the band-pass filter 3a of the way-in window 3 as shown in FIG. 5(c), although those are parallel to each other in the above-mentioned embodiment. Such a modification that the band-pass filter 3a is substituted by a condenser lens with a filter, and/or a condenser lens is located between the band-pass filter 3a and the light receiving surface 4a, is also within the second aspect of the invention. In this case, if the light gathering effect is in excess of the amount of attenuation of the reflecting light from the condenser lens, the resultant performance is comparable with that in the case of using no condenser lens.

As described above, in the present invention, the light receiving surface for receiving the reflecting light from the bar code is large. Accordingly, the condenser lens for gathering the reflecting light may be omitted. With the omission of the condenser lens, the light receiving surface of the light receiving means may be located close to the way-in window. Consequently, the size reduction of the bar code reader is realized.

If the protruded portion is provided which extends to the front from the upper side of the way-in window that is opposite to the lower side thereof closer to the way-out widow, the S/N ratio is improved.

What is claimed is:

1. A bar code reader comprising:
   a case having a front-disposed face and a rear-disposed face, said front-disposed face having a way-out window therein;
   light projecting means for generating a projectable light suitable for illumination of a bar code;
   scanning means, including a light source and a polygon mirror disposed within said case, proximate to said front-disposed face, for generating a scanning pattern by scanning said projectable light from the light projecting means out of said case via said way-out window;
   a way-in window disposed in said front-disposed face for allowing reflected light from the bar code to pass therethrough; and
   light receiving means disposed within said case and having a light receiving surface, for receiving the reflected light through the way-in window and transforming the reflected light into an electrical signal, wherein the light receiving surface of the light receiving means is formed substantially as a rectangle corresponding substantially to a shape and a size of the way-in window, the light receiving means is further disposed a predetermined distance apart from the way-in window but close to the front-disposed face in order to determine an angle of light incident on said light receiving means, while facing the way-in window, and no condenser lens is provided between the light receiving surface and the way-in window.

2. The bar code reader according to claim 1, wherein relationships between the way-in window and the light receiving surface satisfy following conditions:

$$0.5 \ W3 \leq W4 \leq 2.0 \ W3 \text{ and}$$

$$0.5 \ H3 \leq H4 \leq 2.0 \ H3,$$

where W3 and H3 represent a width and a height of the way-in window, and W4 and H4 represent the width and the height of the light receiving surface.

3. The bar code reader according to claim 1, further comprising:
   a band-pass filter attached to the way-in window, wherein the band-pass filter directly receives the reflected light from the bar code and the light receiving means directly receives the reflected light from the band-pass filter.

4. The bar code reader according to claim 1, further comprising:
   a way-out window juxtaposed with respect to the way-in window, the way-out window allowing the reflected light directed from the scanning means to the bar code to pass therethrough; and
   a protruded portion extending from the front-disposed face of said case and over an upper side of the way-in window that is opposite to a lower side thereof closer to the way-out window, for blocking disturbance light.

5. The bar code reader according to claim 1, wherein said light receiving surface is angled with respect to said way-in window.

6. A bar code reader comprising:
   a case having a front-disposed face and a rear-disposed face, said front-disposed face with a way-in window and a way-out window formed proximately therein;
   light projecting means for generating a projectable light;
   scanning means, including a light source and a polygon mirror disposed within said case, proximate to said front-disposed face, for generating a scanning pattern by scanning light projected from the light projecting means;
   said way-in window allowing reflected light from a bar code to pass therethrough; and light receiving means disposed within said case and having a light receiving surface, for receiving the reflected light through the way-in window and transforming the reflected light into an electrical signal, wherein the light receiving surface of the light receiving means is formed substantially as a rectangle similar to the way-in window in shape and size, and the light receiving means is further disposed a predetermined distance apart from but proximate to the way-in window, while facing the way-in window in order to limit an angle of light incident on said light receiving means.

7. The bar code reader according to claim 6, wherein relationships between the way-in window and the light receiving surface satisfy following conditions:

$$0.8\ W3 \leq W4 \leq 1.2\ W3\ \text{and}$$

$$0.8\ H3 \leq H4 \leq 1.2\ H3,$$

where W3 and H3 represent a width and a height of the way-in window, and W4 and H3 represent a width and a height of the light receiving surface.

8. The bar code reader according to claim 6, wherein no condenser lens is provided between the light receiving surface and the way-in window.

9. The bar code reader according to claim 8, further comprising:

said way-out window being juxtaposed to the way-in window, the way-out window allowing the reflected light directed from the scanning means to the bar code to pass therethrough; and a protruded portion extending from the front-disposed face of said case and over an upper side of the way-in window that is opposite to a lower side thereof closer to the way-out window, for blocking disturbance light.

10. The bar code reader according to claim 6, further comprising:

a way-out window juxtaposed with respect to the way-in window, the way-out window allowing the reflected light directed from the scanning means to the bar code to pass therethrough; and a protruded portion extending from the front-disposed surface of said case and over an upper side of the way-in window that is opposite to a lower side thereof closer to the way-out window, for blocking disturbance light.

11. The bar code reader according to claim 6, further comprising:

a band-pass filter attached to the way-in window, wherein the band-pass filter directly receives the reflected light reflected by the bar code and the light receiving means directly receives the reflected light from the band-pass filter.

12. The bar code reader according to claim 6, wherein said light receiving surface is angled with respect to said way-in window.

13. A bar code reader casing for a non-coaxial bar code reader, said casing having a front-disposed face and a rear-disposed face, said case having therein a light receiving surface for receiving light reflected from a bar code and transforming the reflected light into an electrical signal, the bar code reader casing comprising:

a way-in window in said front-disposed face for allowing the reflected light from the bar code to pass therethrough, wherein the way-in window is formed substantially as a rectangle corresponding to a shape and a size of the light receiving surface, and a light channel defined by a wall which is normal to said way-in window and having oppositely disposed ends, said way-in window defining an opening at one of said ends and said light receiving surface being disposed at an opposite end of said light channel, said light channel being sized to direct wanted light to said light receiving surface and to reject unwanted light, and further comprising a way-out window in said front-disposed face and juxtaposed to the way-in window, the way-out window allowing the reflected light directed to the bar code to pass therethrough.

14. The bar code reader casing according to claim 13, further comprising:

a protruded portion extending from said front disposed face of said case over an upper side of the way-in window that is opposite to a lower side thereof closer to the way-out window, for blocking disturbance light.

15. The bar code reader according to claim 13, wherein said light receiving surface is angled with respect to said way-in window.

\* \* \* \* \*